United States Patent
Ionita

(10) Patent No.: US 10,685,251 B2
(45) Date of Patent: Jun. 16, 2020

(54) METHODS AND SYSTEMS FOR DETECTING USER LIVENESS

(71) Applicant: DAON HOLDINGS LIMITED, George Town (KY)

(72) Inventor: Mircea Ionita, Dublin (IE)

(73) Assignee: DAON HOLDINGS LIMITED, Grand Cayman (KY)

( * ) Notice: Subject to any disclaimer, the term of this patent is extended or adjusted under 35 U.S.C. 154(b) by 294 days.

(21) Appl. No.: 15/919,312

(22) Filed: Mar. 13, 2018

(65) Prior Publication Data
US 2019/0286927 A1  Sep. 19, 2019

(51) Int. Cl.
G06K 9/00 (2006.01)
G06F 21/32 (2013.01)
G06K 9/20 (2006.01)

(52) U.S. Cl.
CPC ......... *G06K 9/00906* (2013.01); *G06F 21/32* (2013.01); *G06K 9/00261* (2013.01); *G06K 9/00268* (2013.01); *G06K 9/00288* (2013.01); *G06K 9/2027* (2013.01)

(58) Field of Classification Search
CPC ........... G06K 9/00899; G06K 9/00906; G06K 9/2027; G06K 9/00221; G06K 9/00268; G06K 9/00275; G06K 9/00281; G06K 9/00261; G06K 9/00288; G06F 21/32
USPC ........................................................ 382/118
See application file for complete search history.

(56) References Cited

U.S. PATENT DOCUMENTS

| 5,933,502 A * | 8/1999 | Aucsmith | G06K 9/00885 250/330 |
| 2006/0279726 A1 | 12/2006 | Galambos | |
| 2007/0031010 A1 | 2/2007 | Sukegawa et al. | |
| 2011/0187845 A1 | 8/2011 | Bazakos et al. | |
| 2013/0044920 A1 * | 2/2013 | Langley | G06F 21/32 382/115 |

(Continued)

FOREIGN PATENT DOCUMENTS

EP    2 869 238 A1    5/2015

OTHER PUBLICATIONS

Ige, Emmanuel O., et al. "Exploring Face Recognition under Complex Lighting Conditions with HDR Imaging." CGVC. 2016. (Year: 2016).*

(Continued)

*Primary Examiner* — Geoffrey E Summers
(74) *Attorney, Agent, or Firm* — Kevin McDermott, Esq.

(57) ABSTRACT

A method for detecting user liveness is provided that includes selecting first and second images from a sequence of images. The first and second images are captured under different illumination conditions. The method further includes locating feature calculation windows in corresponding positions on the first and second images. Each window includes a first area and a second area. Moreover, the method includes calculating, by a computing device, a feature value for each window position based on pixels, within the windows located at the position, from the first and second images. Furthermore, the method includes calculating a feature vector from the feature values, calculating a confidence score from the feature vector, and determining the sequence of images includes images of a live user when the confidence score is equal to or greater than the threshold score.

15 Claims, 10 Drawing Sheets

(56) References Cited

U.S. PATENT DOCUMENTS

| | | | |
|---|---|---|---|
| 2015/0104081 A1* | 4/2015 | Ionita | G06K 9/4614 |
| | | | 382/117 |
| 2015/0110365 A1* | 4/2015 | Ionita | G06K 9/00281 |
| | | | 382/118 |
| 2019/0102608 A1* | 4/2019 | Wang | G06K 9/00906 |

OTHER PUBLICATIONS

Chan, Patrick PK, et al. "Face liveness detection using a flash against 2D spoofing attack." IEEE Transactions on Information Forensics and Security 13.2 (2017): 521-534. (Year: 2017).*

Tang, Di et al., Face Flashing: a Secure liveness Detection Protocol based on Light Reflections, NDSS Symposium, San Diego, CA., Feb. 18-21, 2018, 15 pages.

Extended European Search Report for related EPO Application No. 19157244.5, dated Jul. 12, 2019 pp. 1-9.

Chan et al., "Face Liveness Detection Using a Flash Against 2D Spoofing Attack," IEEE, vol. 13, No. 2, Feb. 2018, pp. 521-534.

Peng et al., "Face Liveness Detection for Combating the Spoofing Attack in Face Recognition," Lanzhou, Jul. 13-16, 2014, pp. 176-181.

* cited by examiner

88

| Most Relevant Windows | | | | |
|---|---|---|---|---|
| Geometry Type | Lighting | Color Channels | Size [Width, Height] | Position [X,Y] |
| I | On-state | Red, Blue | [6,4] | [5,10] |
| II | On and Off States | Blue | [8,4] | [2,33] |
| II | On and Off States | Green | [4,4] | [7,18] |
| III | On and Off States | Red | [6,6] | [22,6] |
| IV | On-state | Red, Blue | [6,8] | [34,9] |
| V | Off-state | Red, Blue | [4,4] | [12,15] |

FIG. 18

METHODS AND SYSTEMS FOR DETECTING USER LIVENESS

BACKGROUND OF THE INVENTION

This invention relates generally to authenticating users, and more particularly, to methods and systems for detecting user liveness.

People conduct transactions with service providers in person and remotely over the Internet. Network-based transactions conducted over the Internet may involve purchasing items from a merchant website or accessing confidential information from a website. Service providers who own and operate such websites typically require a person be successfully authenticated before allowing him or her to conduct a desired network-based transaction.

For service providers who require biometric authentication, people provide a claim of identity and remotely captured data regarding a biometric modality. However, imposters have been known to impersonate people by providing a false claim of identity supported by fraudulent data in an effort to deceive an entity into concluding the imposter is the person he or she claims to be. Such impersonations are known as spoofing.

Impostors have been known to use many methods to obtain or create fraudulent data for a biometric modality of another person that can be submitted during biometric authentication transactions. For example, imposters have been known to obtain two-dimensional pictures from social networking sites which can be presented to a camera during authentication to support a false claim of identity. Imposters have also been known to make physical models of a biometric modality, such as a fingerprint using gelatin or a three-dimensional face using a custom mannequin. Moreover, imposters have been known to eavesdrop on networks during legitimate network-based biometric authentication transactions to surreptitiously obtain genuine data of a biometric modality of a person. The imposters use the obtained data for playback during fraudulent network-based authentication transactions. Such fraudulent data are difficult to detect using known liveness detection methods. Consequently, generating accurate network-based biometric authentication transaction results with data for a biometric modality captured from a person at a remote location depends on verifying the physical presence of the person during the authentication transaction as well as accurately verifying the identity of the person with the captured data. Verifying that the data for a biometric modality of a person captured during a network-based biometric authentication transaction conducted at a remote location is from a live person is known as liveness detection or anti-spoofing.

Liveness detection methods have been known to use structure derived from motion of a biometric modality, such as a person's face, to distinguish a live person from a photograph. Other methods have been known to analyze sequential images of eyes to detect eye blinks and thus determine if an image of a face is from a live person. Yet other methods have been known to illuminate a biometric modality with a pattern to distinguish a live person from a photograph. However, people may not consider these methods to be convenient and these methods may not accurately detect spoofing. As a result, these methods may not provide high confidence liveness detection support for service providers dependent upon accurate biometric authentication transaction results.

BRIEF DESCRIPTION OF THE INVENTION

In one aspect, a method for detecting user liveness is provided that includes selecting first and second images from a sequence of images. The first and second images are captured under different illumination conditions. The method further includes locating feature calculation windows in corresponding positions on the first and second images. Each window includes a first area and a second area. Moreover, the method includes calculating, by a computing device, a feature value for each window position based on pixels, within the windows located at the position, from the first and second images. The method also includes calculating a feature vector from the feature values, calculating a confidence score from the feature vector, and determining the sequence of images includes images of a live user when the confidence score is equal to or greater than the threshold score.

In another aspect, a computing device for detecting user liveness is provided that includes a processor and a memory. The memory is configured to store data and the computing device is associated with a network. The memory is also in communication with the processor and has instructions stored thereon which, when read and executed by the processor, cause the computing device to select first and second images from a sequence of images. The first and second images are captured under different illumination conditions. Moreover, when read and executed by the processor, the instructions cause the computing device to locate feature calculation windows in corresponding positions on the first and second images. Each window includes a first area and a second area. Furthermore, when read and executed by the processor, the instructions cause the computing device to calculate a feature value for each window position based on pixels, within the windows located at the position, from the first and second images. Additionally, when read and executed by the processor, the instructions cause the computing device to calculate a feature vector from the feature values, calculate a confidence score from the feature vector, and determine the sequence of images includes images of a live user when the confidence score is equal to or greater than the threshold score.

In yet another aspect, a method for detecting user liveness is provided that includes locating feature calculation windows in different positions on an image of a biometric modality of a user. Each window includes a first area and a second area. Moreover, the method includes calculating, by a computing device, a feature value for each window and position using pixels from the content of different color channels of the image, and calculating a feature vector from the feature values. Furthermore, the method includes calculating a confidence score from the feature vector and determining the image was taken of a live user when the confidence score is equal to or greater than the threshold score.

BRIEF DESCRIPTION OF THE DRAWINGS

FIG. 18 is a diagram illustrating an example look-up table;

DETAILED DESCRIPTION OF THE INVENTION

Figure 1:
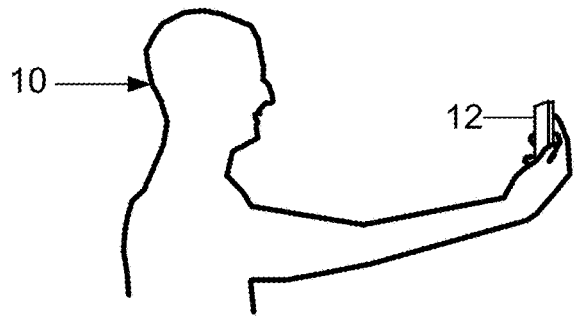
FIG. 1 is a side view of a person operating an example computing device.

FIG. 1 is a side view of a person 10 operating an example computing device 12 to capture data of a biometric modality from his or her self. The person from whom such data is caught is referred to herein as a user 10. The user 10 typically operates the computing device 12 during capture. However, a different person may operate the computing device 12 while the computing device 12 captures data of a biometric modality of the user 10.

Figure 2:
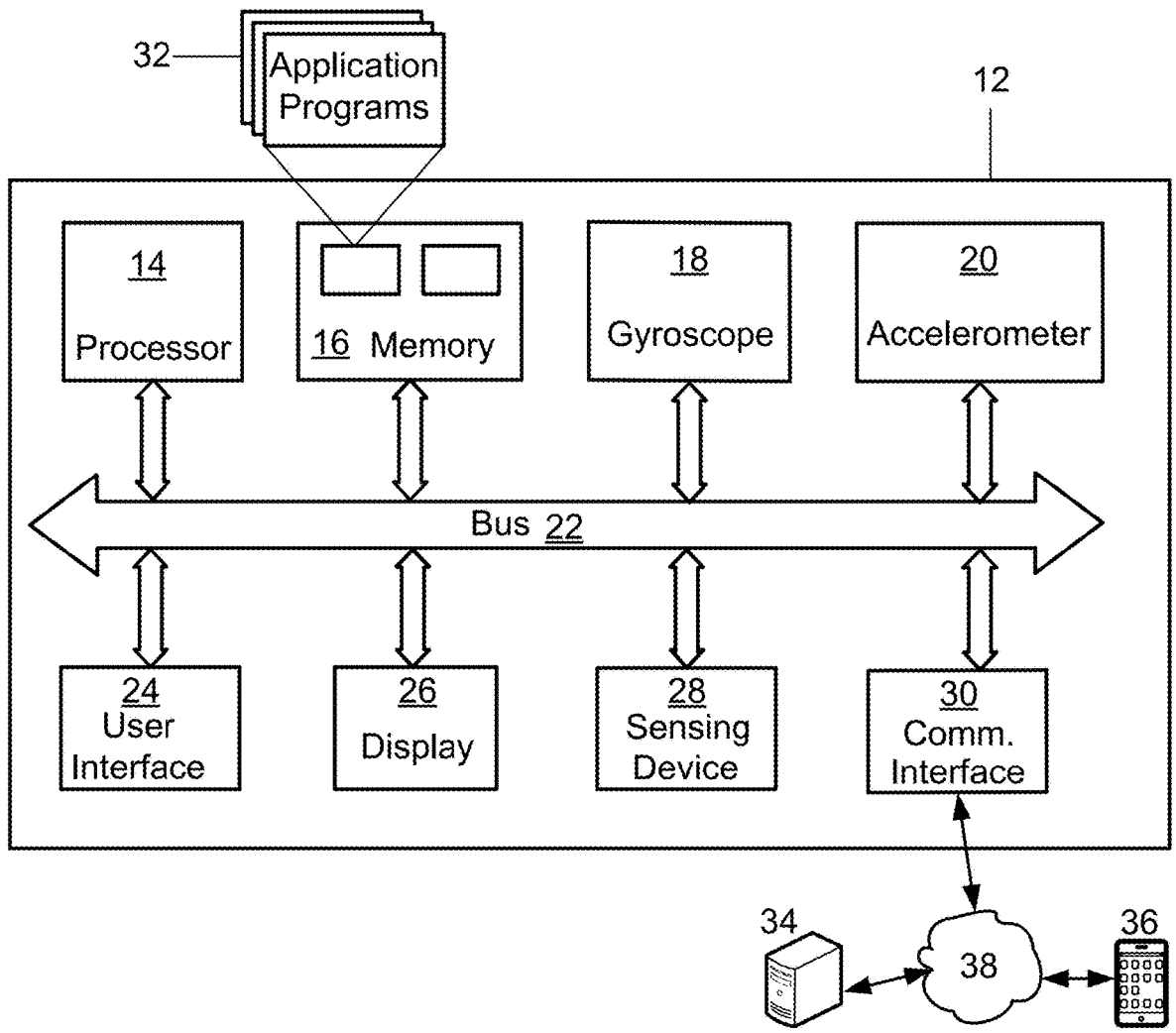
FIG. 2 is a diagram of the example computing device as shown in FIG. 1.

FIG. 2 is a diagram of the example computing device 12 used for detecting user liveness. The computing device 12 includes components such as, but not limited to, one or more processors 14, a memory 16, a gyroscope 18, one or more accelerometers 20, a bus 22, a user interface 24, a display 26, a sensing device 28 and a communications interface 30. General communication between the components in the computing device 12 is provided via the bus 22.

The computing device 12 may be any device capable of at least capturing data of biometric modalities of users, processing the captured data, and performing at least the functions described herein. One example of the computing device 12 is a smart phone. Other examples of the computing device 12 include, but are not limited to, a cellular phone, a tablet computer, a phablet computer, a laptop computer, a personal computer (PC), and any type of device having wired or wireless networking capabilities such as a personal digital assistant (PDA).

The processor 14 executes instructions, or computer programs, stored in the memory 16. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes the computing device 12 to perform at least a portion of the functions and/or methods described herein. Such functions include, but are not limited to, calculating feature values, feature vectors, and confidence scores. Application programs 32, also known as applications, are computer programs stored in the memory 16. Application programs 32 include, but are not limited to, an operating system, an Internet browser application, enrolment applications, authentication applications, user liveness detection applications, face tracking applications, applications that use pre-trained models based on machine learning algorithms, feature vector generator applications, and any special computer program that manages the relationship between application software and any suitable variety of hardware that helps to make-up a computer system or computing environment.

Authentication applications enable the computing device 12 to conduct user verification and identification transactions with any type of authentication data. Machine learning algorithm applications include at least classifiers and regressors. Machine learning algorithms may process data to generate a classification model. For example, a machine learning algorithm may process data that includes signals generated for a user to generate user specific classification models which may be used to facilitate verifying the identity of the user. Examples of such machine learning algorithms include, but are not limited to, support vector machine learning algorithms, decision tree classifiers, linear discriminant analysis learning algorithms, and artificial neural network learning algorithms. Decision tree classifiers include, but are not limited to, random forest algorithms.

The memory 14 may be any non-transitory computer-readable recording medium used to store data including, but not limited to, computer programs and user data records. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a computing device can read computer programs, applications or executable instructions.

The data records are typically for users associated with the computing device 12. The data record for each user may include biometric modality data, biometric modality templates and personal data of the user. Biometric modalities include, but are not limited to, voice, face, finger, iris, palm, and electrocardiogram, and any combination of these or other modalities. Biometric modality data is the data of a biometric modality of a person captured by a capture device. Example capture devices include the computing device 12. Biometric modality data may be in any form including, but not limited to, one or more digital images. A camera included in the computing device 12 may capture one or more digital images of the person. The biometric modality data in the data record is processed to generate at least one biometric modality template. The biometric modality template may be used to verify the identity of a user.

The process of verifying the identity of a user is referred to as a verification transaction. Typically, during a verification transaction, a biometric template is generated from data of a biometric modality of a user captured during the transaction. The generated biometric modality template is compared against the corresponding biometric modality template of the user stored in the user's data record and a matching score is calculated for the comparison. If the matching score meets or exceeds a threshold score, the identity of the user is verified as true. Alternatively, the captured user biometric modality data may be compared against the corresponding biometric modality data stored in the user's record to verify the identity of the user. Authentication transactions may include identity verification transactions and identification (1:N) transactions, where "N" is a number of candidates.

An authentication data requirement is the biometric modality data desired to be acquired from a user during a verification or identification transaction. For the example methods described herein, the authentication data requirement is for the face of the user captured in a sequence of frames. However, the authentication data requirement may alternatively be for any biometric modality or any combination of biometric modalities that may be captured as an image. The sequence of frames may be captured at irregular or regular intervals. A sequence of frames captured at regular intervals may be a video. Each frame includes a digital image of the desired biometric modality.

When a sequence of frames is acquired, the computing device 12 may extract frames from the sequence and assign a time stamp to each frame. The rate at which the computing device 12 extracts frames is the frame extraction rate. An application, for example a face tracker application, may process the extracted frames. The frame processing rate is the number of frames that can be processed within a unit of time. Some frames may take more or less time to process so the frame processing rate may be regular or irregular, and may be the same or different for each authentication transaction. The number of frames processed for each authentication transaction may vary with the frame processing rate. The frame extraction rate may be greater than the frame processing rate so some of the extracted frames may not be processed. The data for a processed frame may be stored in the memory 16 with other data generated by the computing device 12 for that processed frame.

The gyroscope 18 and the accelerometer 20 generate data regarding rotation and translation of the computing device 12 that may be communicated to the processor 14 and the memory 16 via the bus 22. The computing device 12 may alternatively not include the gyroscope 18 or the accelerometer 20, or may not include either.

The user interface 24 and the display 26 allow interaction between a user and the computing device 12. The display 26 may include a visual display or monitor that displays information to a user. For example, the display 26 may be a Liquid Crystal Display (LCD), active matrix display, plasma display, or cathode ray tube (CRT). The user interface 24 may include a keypad, a keyboard, a mouse, an infrared illuminator, a microphone, one or more cameras, and/or speakers. The one or more cameras may be able to capture images under any lighting conditions including infrared light.

Moreover, the user interface 24 and the display 26 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 12 to enter data, change settings, control functions, etc. Consequently, when the touch screen is touched, the user interface 24 communicates this change to the processor 14, and settings can be changed or user entered information can be captured and stored in the memory 16. The display 26 may function as an illumination source to apply illumination to a biometric modality of a user while data for the biometric modality is captured from the user.

When the user interface 24 includes an infrared illuminator and one or more cameras, the infrared illuminator may project infrared light or near infrared light on a biometric modality of a user, and the one or more cameras may detect reflections of the projected light off the biometric modality. The reflections may be off of any number of points on the biometric modality. The detected reflections may be communicated as reflection data to the processor 14 and the memory 16. The processor 14 may use the reflection data to create at least a three-dimensional model of the biometric modality and a sequence of two-dimensional digital images. For example, the reflections from at least thirty thousand discrete points on the biometric modality may be detected and used to create a three-dimensional model of the biometric modality.

The sensing device 28 may include Radio Frequency Identification (RFID) components or systems for receiving information from other devices. The sensing device 28 may alternatively, or additionally, include components with Bluetooth, Near Field Communication (NFC), infrared, or other similar capabilities. The computing device 12 may alternatively not include the sensing device 28.

The communications interface 30 provides the computing device 12 with two-way data communications. Moreover, the communications interface 30 enables the computing device 12 to conduct wireless communications such as cellular telephone calls and to wirelessly access the Internet over the network 38. By way of example, the communications interface 30 may be a digital subscriber line (DSL) card or modem, an integrated services digital network (ISDN) card, a cable modem, or a telephone modem to provide a data communication connection to a corresponding type of telephone line. As another example, the communications interface 30 may be a local area network (LAN) card (e.g., for Ethernet™ or an Asynchronous Transfer Model (ATM) network) to provide a data communication connection to a compatible LAN. As yet another example, the communications interface 30 may be a wire or a cable connecting the computing device 12 with a LAN, or with accessories such as, but not limited to, biometric modality data capture devices. Further, the communications interface 30 may include peripheral interface devices, such as a Universal Serial Bus (USB) interface, a PCMCIA (Personal Computer Memory Card International Association) interface, and the like. Thus, it should be understood the communications interface 30 may enable the computing device 12 to conduct any type of wireless or wired communications such as, but not limited to, accessing the Internet. Although the computing device 12 includes a single communications interface 30, the computing device 12 may alternatively include multiple communications interfaces 30.

The communications interface 30 also allows the exchange of information across the network 38. The exchange of information may involve the transmission of radio frequency (RF) signals through an antenna (not shown). Moreover, the exchange of information may be between the computing device 12 and any other computer systems 34 and any other computing devices 36 capable of communicating over the network 38. The computer systems 34 and the computing devices 36 typically include components similar to the components included in the computing device 12. The network 38 may be a 5G communications network. Alternatively, the network 38 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 38 may also be any type of wired network or a combination of wired and wireless networks.

Examples of other computer systems 34 include computer systems of service providers such as, but not limited to, financial institutions, medical facilities, national security agencies, merchants, and authenticators. Examples of other computing devices 36 include, but are not limited to, smart phones, tablet computers, phablet computers, laptop computers, personal computers and cellular phones. The other computing devices 36 may be associated with any individual or with any type of entity including, but not limited to, commercial and non-commercial entities. The computing devices 10, 36 may alternatively be referred to as computer systems or information systems, while the computer systems 34 may alternatively be referred to as computing devices or information systems.

Figure 3:
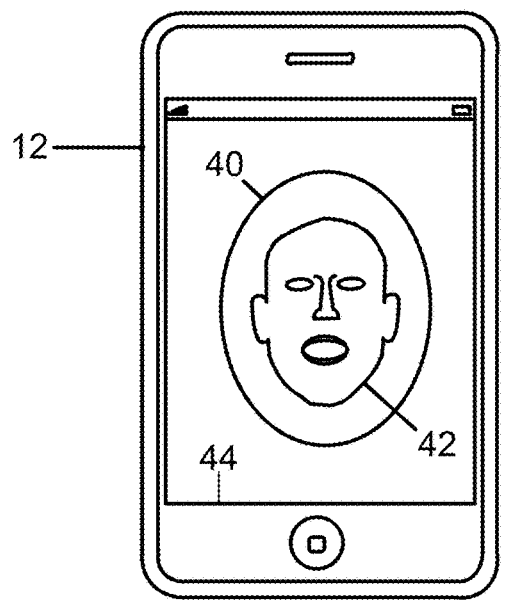
FIG. 3 is a front view of the example computing device displaying an example visual aid and an image of the person within the visual aid.

FIG. 3 is a front view of the computing device 12 displaying an example visual aid 40 and a facial image 42 of the user 10 positioned within the visual aid 40. The visual aid 40 may be displayed by the computing device 12 and functions as a guide that enables users to capture data usable for enhancing the accuracy of user liveness detection and generating trustworthy verification transaction results. One example shape of the visual aid 40 is an oval. Other example shapes include, but are not limited to, a circle, a square, a rectangle, and an outline of the biometric modality desired to be captured. Moreover, the visual aid 40 may be any shape defined by lines and/or curves. However, it is not necessary that the visual aid 40 be displayed by the computing device 12. The visual aid 40 may alternatively be a part of the computing device 12 itself. For example, the visual aid 40 may be a perimeter 44 of the computing device 12 display screen.

The image 42 is to be positioned within the visual aid 40 while capturing data of a biometric modality of the user. The image 42 may be close to the visual aid 40 border but not outside the border. Alternatively, a small percentage of the facial image 42 may be allowed to extend beyond the border. A small percentage may be between about zero and ten percent.

Figure 4:
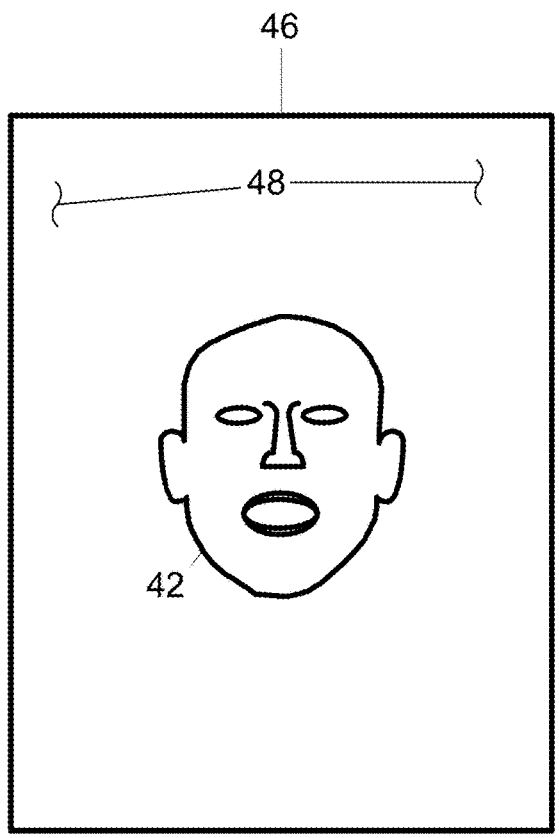
FIG. 4 is an illustration of an example frame included in a sequence of frames.

FIG. 4 is an illustration of an example frame 46 included in a sequence of frames. The frame 46 includes the facial image 42 and an image 48 of the background behind the user.

Figure 5:
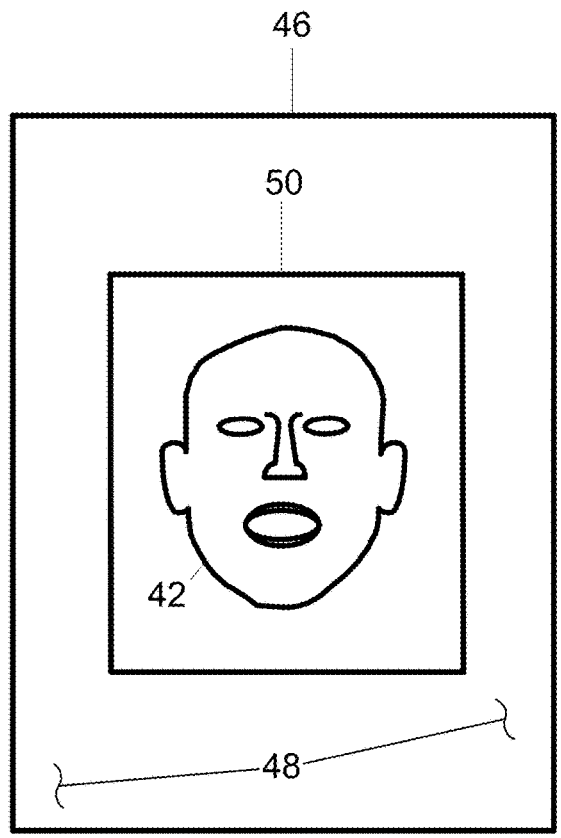
FIG. 5 is an illustration of the example frame as shown in FIG. 4 further including a region of interest.

The information shown in FIG. 5 is the same information shown in FIG. 4 as described in more detail below. As such, features illustrated in FIG. 5 that are identical to features illustrated in FIG. 4 are identified using the same reference numerals used in FIG. 4.

FIG. 5 is an illustration of the example processed frame 46 as shown in FIG. 4, further including a region of interest 50. The region of interest 50 is a portion of the image included in a frame 46 that is used for detecting user liveness. More specifically, the region of interest 50 includes pixels for the image 42 and pixels for a minimal portion of the background image 48. The pixels that define the image 42 and the background 48 in a frame are the image data for the frame. Alternatively, or additionally, the image data for a frame may include any data associated with the frame 46, for example, the date and time the frame was captured. The region of interest 50 is square; however, the region of interest 50 may have any shape that enhances liveness detection as described herein such as a rectangle, circle or oval.

The size of the image 42 within the region of interest 50 varies depending on the distance between the user and computing device 12. Typically, the smaller the distance the larger the image 42 and the greater the distance the smaller the image 42. To facilitate calculating accurate liveness detection results, the image 42 is normalized prior to initiating liveness detection calculations. The images 42 shown in FIGS. 4 and 5 are pre-normalization images.

Figure 6:
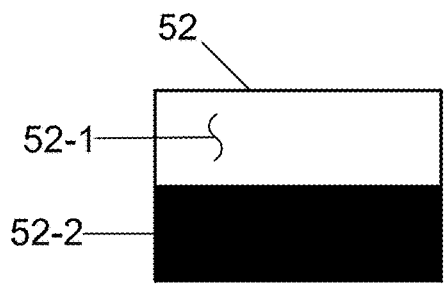
FIGS. 6 to 10 are diagrams illustrating example feature calculation windows.

FIG. 6 is a diagram illustrating an example feature calculation window 52 that may be used to calculate feature values for each frame. The window 52 is rectangular and includes two equal subareas, a first rectangular subarea 52-1 and a second rectangular subarea 52-2. The first rectangular subarea 52-1 forms a top half of the window 52 and the second rectangular subarea 52-2 forms a bottom half of the window 52. The second rectangular subarea 52-2 is shaded to facilitate distinguishing between the first and second subareas. The arrangement of the rectangular subareas 52-1, 52-2 within the window 52 determines the geometric type of the window 52. The subareas 52-1, 52-2 are arranged in a type I geometry so the window 52 is a geometric type I window.

Figure 7:
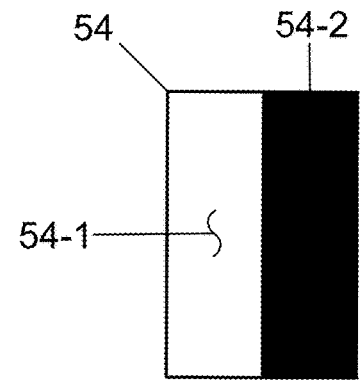

FIG. 7 is a diagram illustrating another example feature calculation window 54 similar to the window 52 shown in FIG. 6. However, the window 54 is rotated such that a first rectangular subarea 54-1 forms a left half of the window 54 and a second rectangular subarea 54-2 forms a right half of the window 54. The first 54-1 and second 54-2 rectangular subareas are equal. The arrangement of the subareas 54-1, 54-2 within the window 54 form a type II geometry so the window 54 is a geometric type II window.

Figure 8:
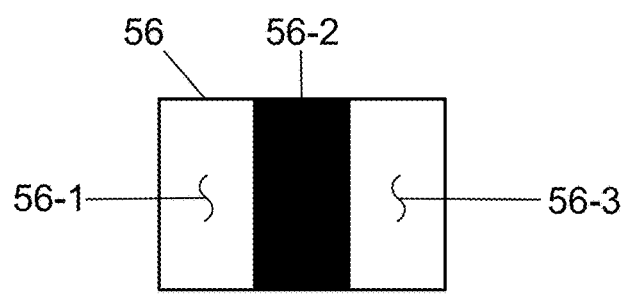

FIG. 8 is a diagram illustrating another example feature calculation window 56. The window 56 is rectangular and includes three equal rectangular subareas, a first subarea 56-1, a second subarea 56-2 and a third subarea 56-3. The second subarea 56-2 is shaded to facilitate distinguishing the three subareas from each other. The arrangement of the three sub areas 56-1, 56-2, 56-3 forms a type III geometry so the window 56 is a geometric type III window.

Figure 9:
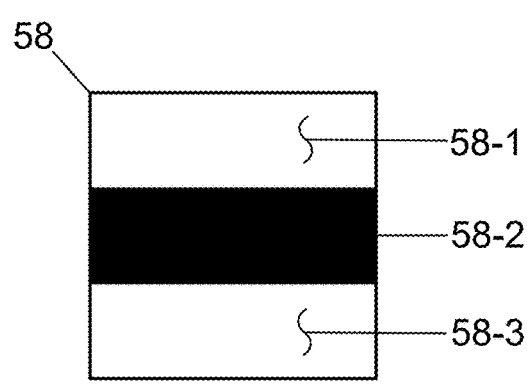

FIG. 9 is a diagram illustrating yet another example feature calculation window 58. The window 58 is square and includes three equal rectangular subareas, a first subarea 58-1, a second subarea 58-2, and a third subarea 58-3. The first subarea 58-1 forms a top third of the window 58, the second subarea 58-2 forms a middle third of the window 58, and the third subarea 58-3 forms a bottom third of the window 58. The second subarea 58-2 is shaded to facilitate distinguishing the three subareas from each other. The arrangement of the three rectangular subareas 58-1, 58-2, 58-3 forms a type IV geometry so the window 58 is a geometric type IV window.

Figure 10:
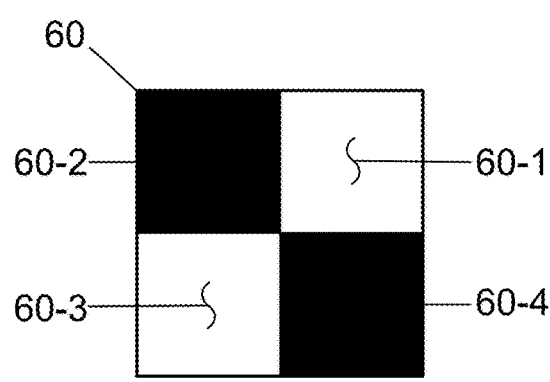

FIG. 10 is a diagram illustrating another example square feature calculation window 60 similar to the window 58 shown in FIG. 9. However, the window 60 includes four equal square subareas, a first subarea 60-1, a second subarea 60-2, a third subarea 60-3, and a fourth subarea 60-4. Subareas 60-2 and 60-4 are shaded to facilitate distinguishing the subareas 60-1, 60-2, 60-3, and 60-4 from each other. The arrangement of the four rectangular subareas 60-1, 60-2, 60-3, and 60-4 forms a type V geometry so the window 60 is a geometric type V window. The size of the windows 60, 62 is different than the size of the windows 54, 56, 58.

The subareas 52-1, 52-2, 54-1, 54-2, 56-1, 56-2, 56-3, 58-1, 58-2, 58-3, 60-1, 60-2, 60-3, and 60-4 each define a different group of pixels when the respective feature calculation window 52, 54, 56, 58, 60 is located in a position on the region of interest 50. For feature calculation windows having multiple shaded and/or non-shaded subareas, the multiple shaded areas may be combined to form a single shaded subarea such that when the feature calculation window is located in a position on the region of interest 50 the shaded subareas define a single pixel group. Likewise, the non-shaded subareas may be combined to form a single subarea such that when the window is located in a position on the region of interest 50, the non-shaded subareas define a single pixel group. For example, the shaded subareas 60-2 and 60-4 as shown in FIG. 10 may be combined to form a first subarea, and the subareas 60-1 and 60-3 may be combined to form a second subarea, such that when the window 60 is located in a position on the region of interest 50 the combined subareas 60-2 and 60-4, and the combined subareas 60-1 and 60-3, define different pixel groups.

Although the windows 52, 54, 56 are rectangular, and the windows 58 and 60 are square, the windows 52, 54, 56, 58, 60 may alternatively be any shape that facilitates calculating feature values such as, but not limited to, elliptical. Moreover, the windows 52, 54, 56, 58, 60 may be any size that facilitates calculating feature values, and the subareas 52-1, 52-2, 54-1, 54-2, 56-1, 56-2, 56-3, 58-1, 58-2, 58-3, 60-1, 60-2, 60-3, and 60-4 may alternatively be any shape and size that facilitates calculating feature values. Additionally, it should be understood that many different types of feature calculation window may be provided in addition to those described herein. Such other types of feature calculation window may include any number of the same or differently shaped subareas.

Varying the illumination intensity applied to a biometric modality over time, while capturing data of the modality as a sequence of frames facilitates detecting user liveness. The computing device 12 may illuminate a biometric modality in a manner that creates different illumination conditions while the computing device 12 captures data of the modality, and the windows 52, 54, 56, 58, 60 may be used to calculate feature values for frames subject to such different illumination conditions.

Figure 11:
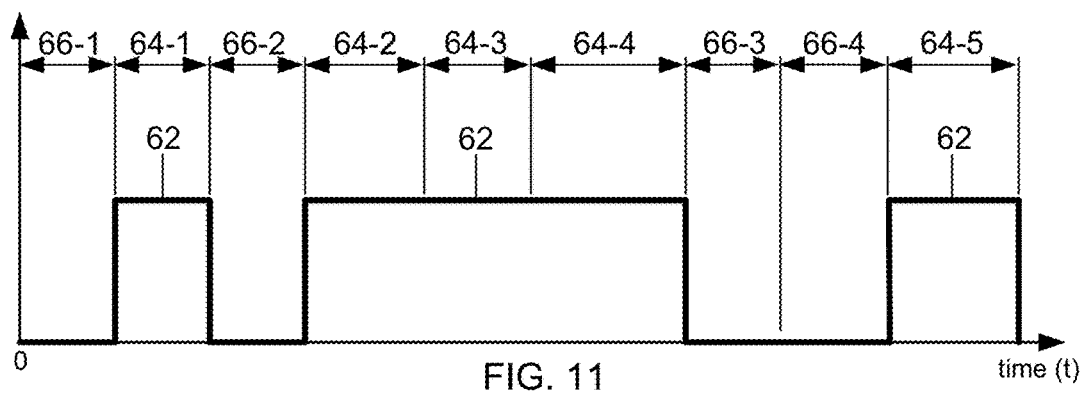
FIGS. 11 and 12 are diagrams illustrating an example illumination signal.

FIG. 11 is a diagram illustrating an example illumination signal 62 that represents the times during which illumination may be applied to a biometric modality. According to the signal 62 illumination is applied during on-states 64-1, 64-2, 64-3, 64-4, 64-5. Illumination is not applied during off-states 66-1, 66-2, 66-3, 66-4. The illumination intensity is applied randomly so the number and location of the on and off-states in the signal 62 are random. The illumination may be applied as any type of light including, but not limited to, white light, infrared light, near infrared light, or any combination of light. Combinations of light include different lights applied simultaneously, for example, simultaneously applying white and infrared light.

Infrared light provides advantages that allow more control over the liveness detection calculations versus other types of light. Such advantages include, but are not limited to, infrared light is not intrusive compared against other types of light, the duration of the on and off-states may be very short because users cannot see infrared light, infrared light may be used to detect liveness in total darkness, and infrared light might provide more robust liveness detection results in sunlight.

Transitions between the on and off-states are instantaneous which indicates that the illumination source is typically activated or deactivated at the time of the transition. However, the signal 62 may alternatively include longer temporal transitions between the on and off-states. Such longer transitions indicate that the illumination source activates or deactivates the applied illumination over time by increasing or decreasing the illumination intensity.

The on-states 64-1, 64-2, 64-3, 64-4, 64-5 each represent a single application of illumination. On-states 64-2, 64-3, 64-4 are applied consecutively over time and together define an extended on-state period. The accuracy of liveness detection results is enhanced when the extended periods of either state are limited to three states. However, the number of states included in an extended period may be greater depending on the desired accuracy of the liveness detection results.

Figure 12:
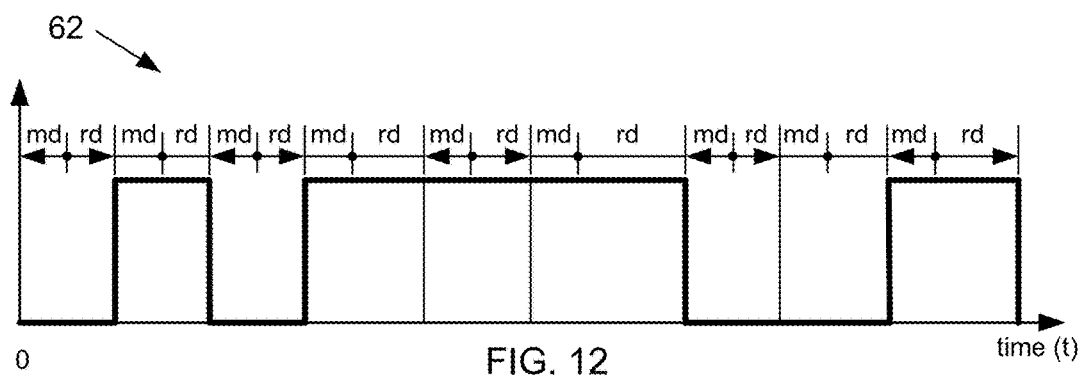

FIG. 12 is a diagram illustrating the illumination signal 62 as shown in FIG. 11, further including information regarding on and off-state durations. More specifically, the duration of each on-state and each off-state is determined by a minimum duration (md) component and a random duration (rd) component. The minimum duration (md) component has a constant duration of three hundred milliseconds. For other example signals, the minimum duration (md) component may have any duration between about three and four hundred milliseconds. The random duration (rd) component has a different duration for each on-state and a different duration for each off-state. The random duration varies between about zero and four hundred milliseconds. Thus, the duration of the on-states and of the off-states ranges between three and seven hundred milliseconds. However, in other example signals the duration of the on-states and of the off-states may be between about four and eight hundred milliseconds. Because the duration includes a random component the durations are random.

Illumination applied to a biometric modality reflects off the biometric modality as specular and diffuse reflections. The reflections can be captured by the computing device camera and processed to create a signal.

Figure 13:
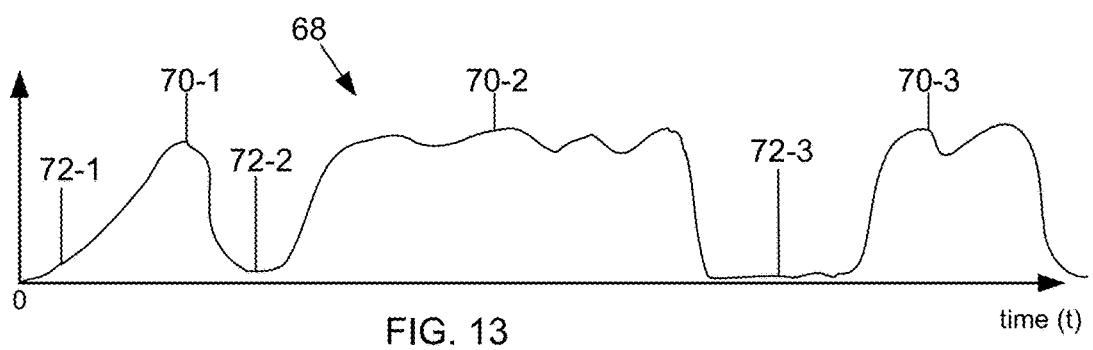
FIG. 13 is a diagram illustrating an example reflection signal.

FIG. 13 is a diagram illustrating an example signal 68 which represents reflections of illumination applied to a biometric modality in accordance with the signal 62. The signal 68 indicates the values of reflected illumination captured over time. The signal 68 has a shape generally comparable to the signal 62, but is not an exact copy because the reflections are not an exact copy of the applied illumination. The signal 68 includes three regions 70-1, 70-2, and 70-3 that roughly correspond to, but are delayed in time versus on-states 64-1, 64-2 to 64-4, and 64-5. Moreover, the signal 68 includes three regions 72-1, 72-2, and 72-3 that roughly correspond to, but are delayed in time versus, off-states 66-1, 66-2, and 66-3 to 66-4. The signal 68 can be processed to remove the time delay such that the regions 70-1, 70-2, and 70-3 approximately align with the on-states 64-1, 64-2 to 64-4, and 64-5, respectively, and such that the regions 72-1, 72-2, and 72-3 approximately align with the off-states 66-1, 66-2, and 66-3 to 66-4, respectively.

Figure 14:
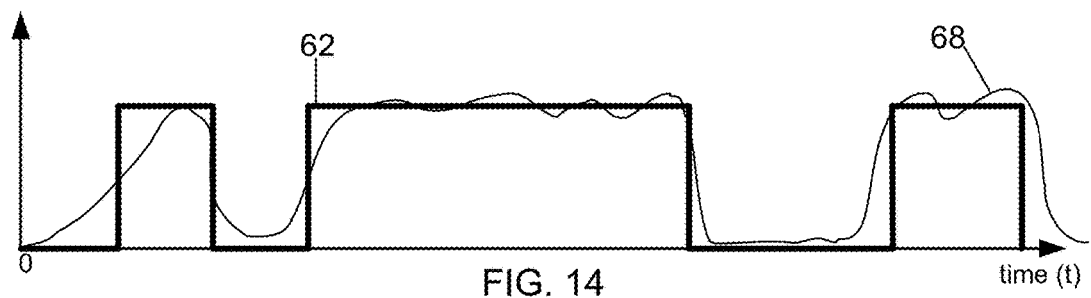
FIG. 14 is a diagram illustrating the example illumination signal shown in FIG. 11 approximately aligned with the example reflection signal shown in FIG. 13.

FIG. 14 is a diagram illustrating the signal 68 approximately aligned with the signal 62. Data from frames captured when the signals 62 and 68 are both in the on-state and both in the off-state may be used to detect liveness. Typically, two frames are used to detect liveness, one frame captured during an off-state and another frame captured during an on-state. The frame from the on-state may be the frame having the highest pixel intensity of the frames in the on-state, and the frame from the off-state may be the frame having the lowest pixel intensity of the frames in the off-state. Alternatively, the frame from the on-state may be a frame selected from the frames included in a region of maximum correlation between the on-state regions of the signals 62, 68. The frame from the off-state may be a frame selected from the frames included in a region of maximum correlation between the off-state regions of the signals 62, 68. The frames from the on and off-states may be selected in any manner. Using two frames enhances the accuracy of liveness detection and facilitates reducing the time for generating liveness detection results. The frames are not sequential because sequential frames are typically captured under the same applied illumination.

Figure 15:
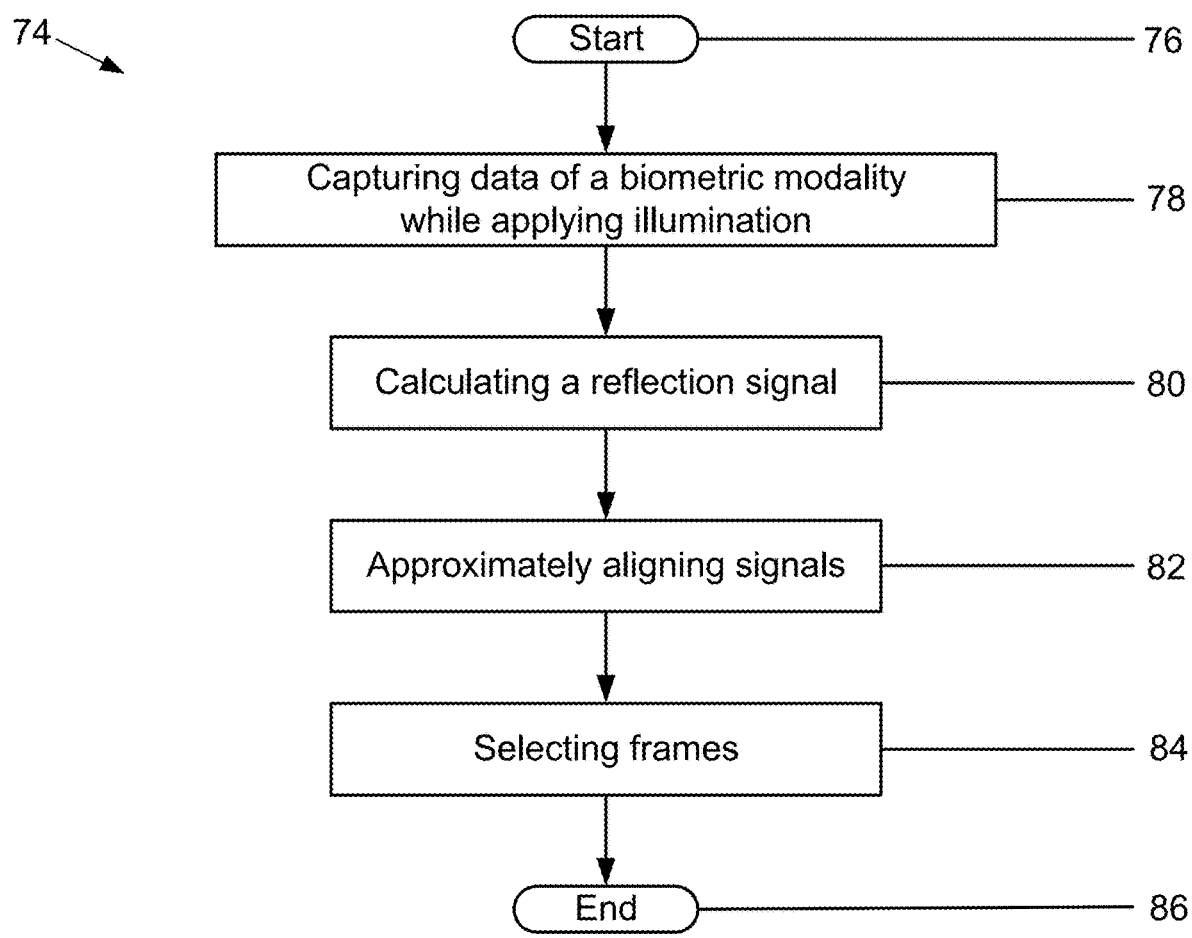
FIG. 15 is a flowchart illustrating an example method for selecting frames from a sequence of frames.

FIG. 15 is a flowchart 74 illustrating an example method for selecting frames 46, from a sequence of frames, that are to be used for detecting user liveness. The process starts 76 with a user capturing 78 data of a biometric modality from his or her self with the computing device 12 while the computing device 12 applies illumination to the biometric modality in accordance with the signal 62. Information regarding reflections of the applied illumination off the biometric modality is included in the image data of each frame 46. Next, processing continues by analyzing the image data of each frame 46, calculating 80 the signal 68, and approximately aligning 82 the signal 68 with the signal 62. Processing continues by selecting 84 a frame 46 captured during an on-state and another frame 46 captured during an off-state. Next, processing ends 86.

Figure 16:
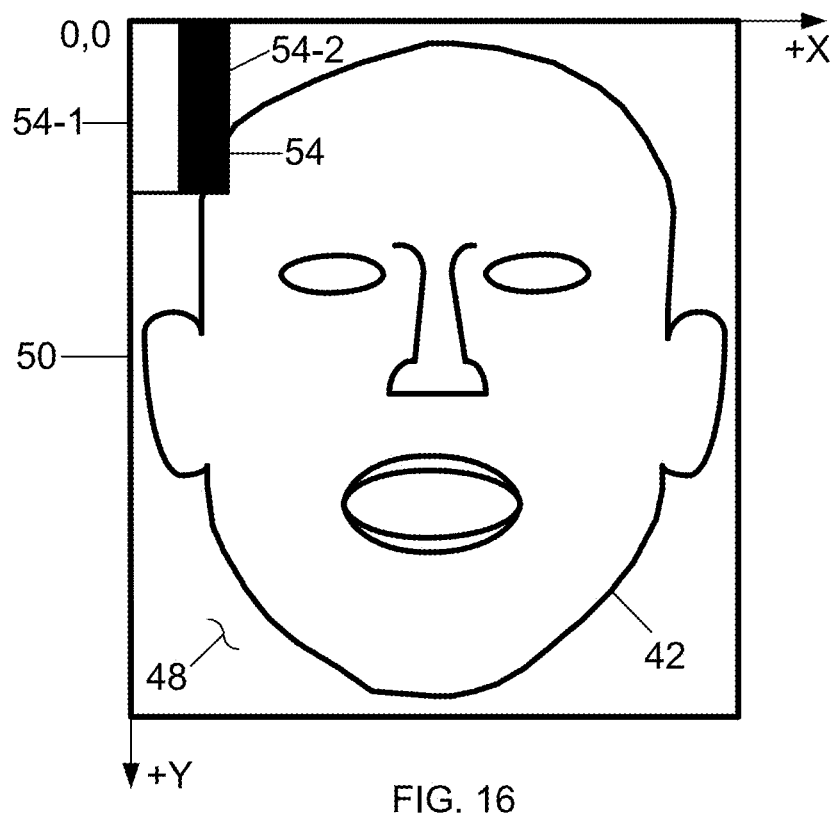
FIG. 16 is an enlarged plan view of a region of interest with applied illumination.

FIG. 16 is an enlarged plan view of the region of interest 50 including a normalized image 42 and the window 54 electronically and/or mathematically superimposed thereon. The window 54 has an area smaller than the region of interest 50. A two-dimensional Cartesian coordinate system having X and Y-axes is associated with the region of interest 50. The origin (0,0) of the Cartesian coordinate system is coincident with an upper left-hand corner of the region of interest 50. Alternatively, the origin may be coincident with any corner of the region of interest 50, or any point within the region of interest 50. The region of interest 50 is from a frame 46 captured while illumination was applied by the computing device 12. It should be understood that during capture biometric modalities are subject to ambient lighting conditions as well as the applied illumination. The image 42 and background 48 are the red channel content from the red-green-blue (RGB) pixel data included in the image data of the frame 46.

The feature calculation window 54 is located in an upper left-hand corner of the region of interest 50. The window 54 may be incrementally moved over the entire region of interest 50, horizontally and vertically, to occupy every possible incremental position within the entire region of interest 50. The X and Y coordinates for the upper left-hand corner of the window 54 are calculated for each incremental position. Alternatively, the X and Y coordinates for any corner of the window 54 may be calculated, or the coordinates of the window 54 center point may be calculated.

The window 54 may be incrementally moved, in the positive direction along the X-axis, from an upper left corner of the region of interest 50 to an upper right corner of the region of interest 50. After moving the window by one increment in the positive direction along the Y-axis, the window 54 is incrementally moved, in the negative direction along the X-axis, to the left side of the region of interest 50. The window 54 may thus be incrementally moved over the entire region of interest 50 to occupy all possible positions within the region of interest 50. The increment is a single pixel. However, the increment may alternatively be any number of pixels that facilitates detecting user liveness as described herein. Alternatively, the window 54 may be located in all positions within the region of interest 50 in any manner. For example, the window 54 may be randomly located in all the possible positions.

At each position, the subareas 54-1 and 54-2 define groups of pixels, within the region of interest 50, that may be used for calculating a feature value for the position. Because the region of interest 50 is from a frame captured in the on-state, the group of pixels included in the subarea 54-1 only are identified. The pixels within the first subarea 54-1 constitute a first pixel group. Each pixel has an intensity value. The intensity values of the pixels in the first pixel group are averaged to calculate a first average pixel value. After the first average pixel value is calculated, the window 54 is moved incrementally or otherwise into the next position.

Figure 17:
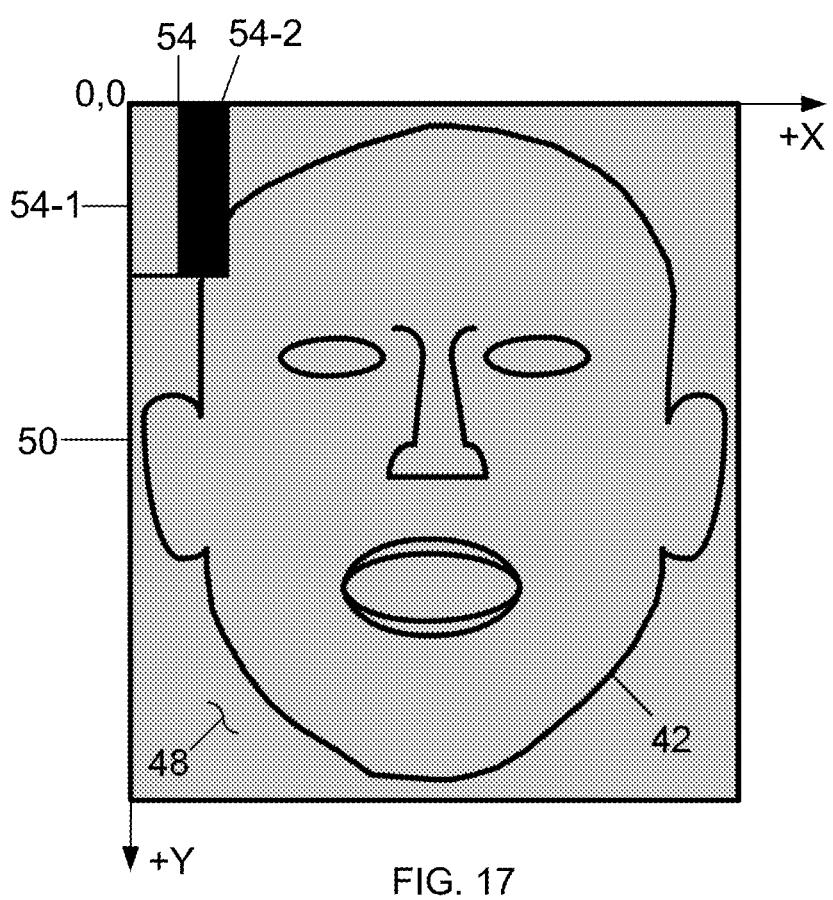
FIG. 17 is an enlarged plan view of the region of interest without applied illumination.

The information shown in FIG. 17 is the same information shown in FIG. 16 as described in more detail below. As such, features illustrated in FIG. 17 that are identical to features illustrated in FIG. 16 are identified using the same reference numerals used in FIG. 16.

FIG. 17 is an enlarged plan view of the region of interest 50 similar to that shown in FIG. 16. However, the region of interest 50 is from a frame 46 captured during an off-state so during capture the biometric modality was subject to ambient lighting conditions only. Because the frame 46 was captured under ambient lighting conditions only, the region of interest 50 is shaded. The window 54 is incrementally moved across the region of interest 50 as described herein with regard to FIG. 16 and thus occupies positions corresponding to those described herein with regard to FIG. 16. In each position the pixels within the second subarea 54-2 constitute a second pixel group. The intensity values of the pixels in the second pixel group are averaged to calculate a second average pixel value. After the second average pixel value is calculated, the window 54 is moved incrementally or otherwise into the next position.

Because the window 54 is located in corresponding positions across the region of interest 50 in FIGS. 16 and 17, a first and a second average pixel value is calculated for each corresponding position of the window 54. As a result, a feature value can be calculated for each corresponding position as the difference between the first and second average pixel values. The calculated feature value and the X, Y coordinates of the feature calculation window for each position may be stored in the computing device 12.

Feature values for each geometric type window are likewise calculated. After calculating a feature value and coordinates for each position of the windows 52, 54, 56, 58, 60 a vector is created for the frame. A vector is created for each processed frame included in the sequence of frames 46. The vectors are processed by an algorithm which creates a tree-based model. For example, the algorithm may create a random forest model. By virtue of creating the tree-based model, the algorithm automatically determines, or judges, which window geometry types, lighting conditions, color channels, sizes, and positions are most relevant to detecting user liveness.

The pixels within the region of interest 50 include data regarding reflected light. The applied illumination reflects off a user's face. For example, white light reflects off the user's face as a distribution of red, green and blue light with red being the dominant color. White light applied by, for example, a computer screen, reflects more predominantly as blue light with lesser red and green light. Thus, reflected light that includes primarily blue light, while expecting primarily red, likely indicates the user is an imposter. Consequently, the red, green, and blue color channel data included in the region of interest 50 may be important for detecting liveness. As a result, at each position of each feature calculation window, separate feature values may be calculated for the red, green and blue color channels of the region of interest.

It should be understood that first and second average pixel values may be calculated for each position of each feature calculation window as described herein with regard to FIGS. 16 and 17, for the red, green and blue color channel content of the image 42. A feature value for each position may be calculated by taking the difference between the first and second average pixel values for the respective color. For example, for each position in the red channel content the feature value is calculated as the difference between the first and second average pixel values.

Feature values may also be calculated using different color channel content of the same image 42. For example, the feature value for a position may be calculated as the difference between the first average pixel value calculated for the red color channel and the second average pixel value calculated for the green color channel. Instead of using RGB color content, any other type of color content may be used including but not limited to, CIE, XYZ, CIELAB, YUV, and HSV.

FIG. 18 is a diagram illustrating an exemplary look-up table 88 that includes information regarding combinations of window geometry type, lighting conditions, color channels, window size, and window position deemed most relevant to detecting user liveness. The lighting conditions include the illumination to be applied to the biometric modality during capture and includes the on-state, the off-state, or both the on and off-states. The color channels identify pixel color data of the image 42 to be used for calculating feature values. The window size is given in width and height while the position is given in X, Y coordinates. The X, Y coordinates are those coordinates calculated for the different positions of the windows 52, 54, 56, 58, 60 to be used for calculating feature values. The table 88 may be stored in the computing device 12, or any other device 36 or system 34 that communicates over the network 38. The table 88 includes six different combinations of window geometry type, lighting conditions, color channels, window size, and window position. Alternatively, the table 88 may include any number of different combinations.

Figure 19:
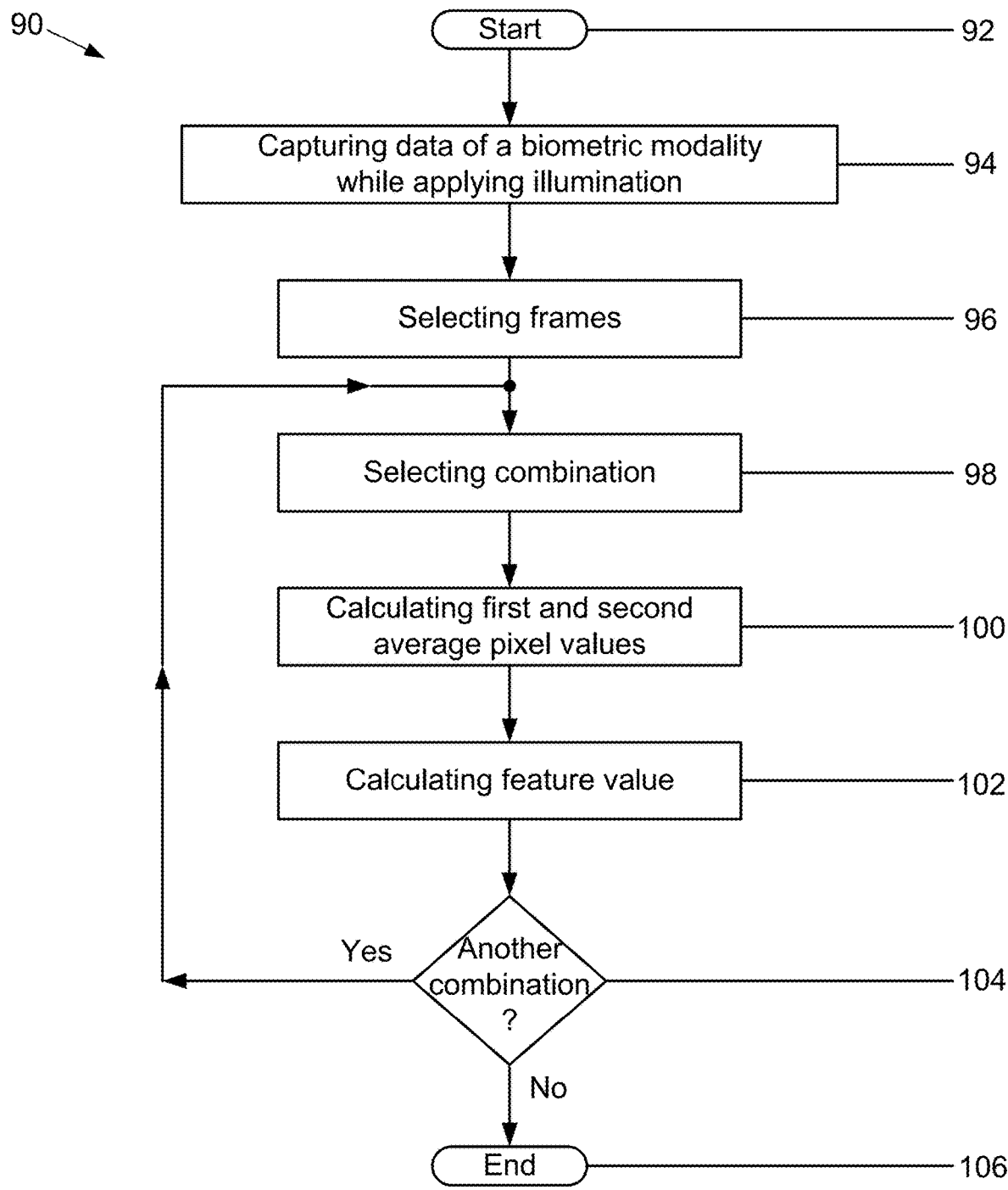
FIG. 19 is a flowchart illustrating an example method for calculating feature values.

FIG. 19 is a flowchart 90 illustrating an example method for calculating feature values for use in detecting user liveness. The process starts 92 with a user capturing 94 data of a biometric modality from his or her self with the computing device 12 as a sequence of frames while the computing device 12 applies illumination in accordance with the signal 62. Next, processing continues by selecting 96 from the sequence a frame 46 captured during an on-state and a frame 46 captured during an off-state, and selecting 98 from the table 88 a combination of window geometry type, lighting condition, color channel, window size and X, Y coordinate position. The upper left corner of the selected window is located at the X, Y coordinate position on the region of interest 50 from each selected frame. Next, processing continues by calculating 100 the first and second average pixel values and calculating 102 the feature value as the difference between the first and second average pixel values. The calculated feature value may be stored in the memory 16.

After calculating the feature value 102, processing continues by determining 104 if another window geometry type, lighting condition, color channel, window size and X, Y coordinate position combination is to be used for calculating another feature value. If each combination listed in the table 88 has not been used to calculate a feature value, then another combination is required and processing continues by selecting 98 a combination from the table 88 that has not been used to calculate a feature value. When another combination is not required, processing ends 106.

FIGS. 20A, 20B, 21A, 21B, 22A, 22B, 23A, 23B, 24A and 24B illustrate different window geometry types located in positions on the region of interest 50 for calculating feature values.

Figure 20A:
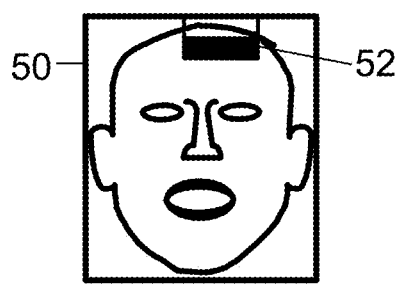
FIGS. 20A, 21A, 22A, 23A, and 24A are plan views of the region of interest, including example feature calculation windows, captured with applied illumination.

FIG. 20A is a plan view of the region of interest 50 from a frame 46 captured while the biometric modality was illuminated in accordance with the signal 62. The window 52 is located in a position over the region of interest 50 such that the upper left-hand corner of the window 52 is located at the X, Y coordinates given in the table 88 for the window 52. A first average pixel value for the first subarea 52-1 is calculated for the position.

Figure 20B:
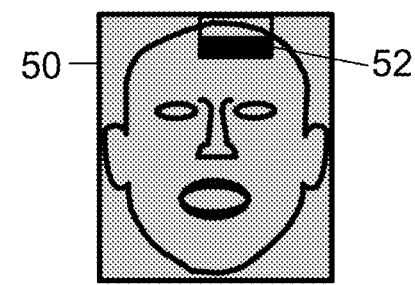
FIGS. 20B, 21B, 22B, 23B, and 24B are plan views of the region of interest, including example feature calculation windows, captured without applied illumination.

FIG. 20B is a plan view of the region of interest 50 from a frame 46 captured during an off-state of the signal 62. The window 52 is located in a position over the region of interest 50 such that the upper left corner of the window 52 is located at the X, Y coordinates in the table 88 for the window 52. A second average pixel value for the second subarea 52-2 is calculated for the position. A feature value for the position is calculated by taking the difference between the first and second average pixel values.

The information shown in FIGS. 21A, 22A, 23A, and 24A, and FIGS. 21B, 22B, 23B, and 24B is the same information shown in FIGS. 20A and 20B, respectively, as described in more detail below. As such, features illustrated in FIGS. 21A, 22A, 23A, and 24A, and 21B, 22B, 23B, and 24B that are identical to features illustrated in FIGS. 20A and 20B, respectively, are identified using the same reference numerals used in FIGS. 20A and 20B, respectively.

Figure 21A:
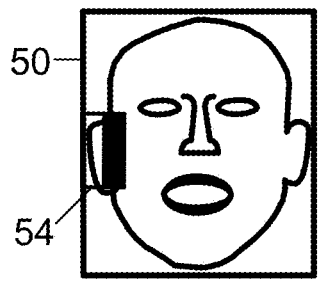
Figure 21B:
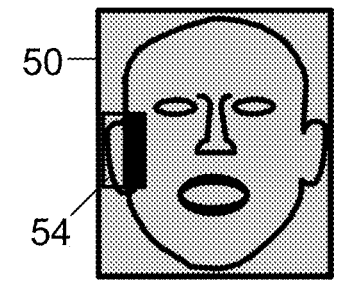

FIGS. 21A and 21B are plan views of the regions of interest 50 as shown in FIGS. 20A and 20B, respectively. However, a feature calculation window 54 is located in a position over the regions of interest 50 such that the upper left corner of the window 54 is located at corresponding coordinates in each region of interest 50. First and second average pixel values are calculated for the position as described herein with regard to FIGS. 20A and 20B, and a feature value for the position is calculated as the difference between the first and second average pixel values.

Figure 22A:
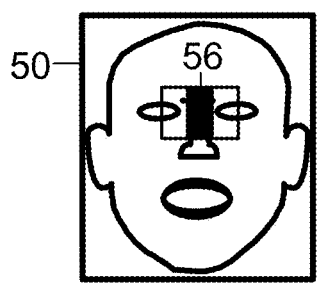
Figure 22B:
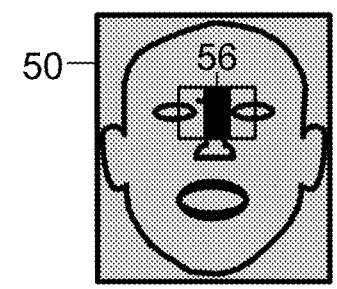

FIGS. 22A and 22B are plan views of the regions of interest 50 as shown in FIGS. 20A and 20B, respectively. However, a feature calculation window 56 is located in a position over the regions of interest 50 such that the upper left corner of the window 56 is located at corresponding coordinates in each region of interest 50. First and second average pixel values are calculated for the position as described herein with regard to FIGS. 20A and 20B, and a feature value for the position is calculated as the difference between the first and second average pixel values.

Figure 23A:
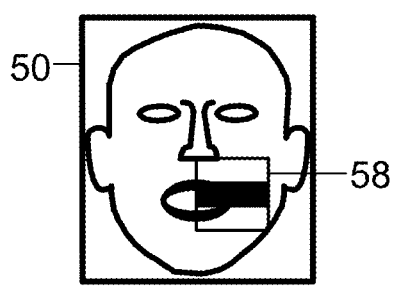
Figure 23B:
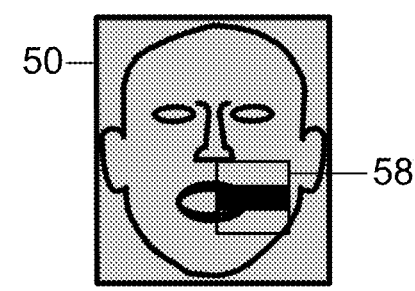

FIGS. 23A and 23B are plan views of the regions of interest 50 as shown in FIGS. 20A and 20B, respectively. However, a feature calculation window 58 is located in a position over the regions of interest 50 such that the upper left corner of the window 58 is located at corresponding coordinates in each region of interest 50. First and second average pixel values are calculated for the position as described herein with regard to FIGS. 20A and 20B, and a feature value for the position is calculated as the difference between the first and second average pixel values.

Figure 24A:
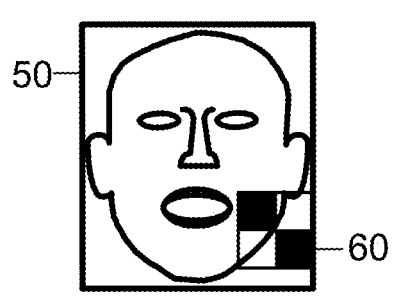
Figure 24B:
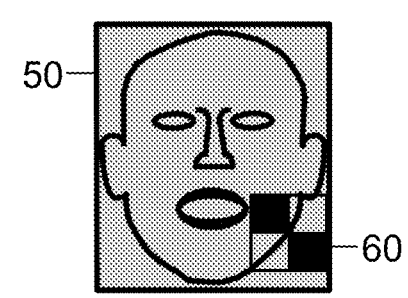

FIGS. 24A and 24B are plan views of the regions of interest 50 as shown in FIGS. 20A and 20B, respectively. However, a feature calculation window 60 is located in a position over the regions of interest 50 such that the upper left corner of the window 60 is located at corresponding coordinates in each region of interest 50. First and second average pixel values are calculated for the position as described herein with regard to FIGS. 20A and 20B, and a feature value for the position is calculated as the difference between the first and second average pixel values.

A feature value is likewise calculated for each combination listed in the table 88. The feature values are processed by a tree-based model which calculates the confidence score for the frames 46. The confidence score is a value indicating the degree of confidence calculated by statistical methods that the images captured in the frames were captured from a live user. The tree-based model may be implemented to act as a regressor or the tree-based model may be implemented to act as a classifier.

Figure 25:
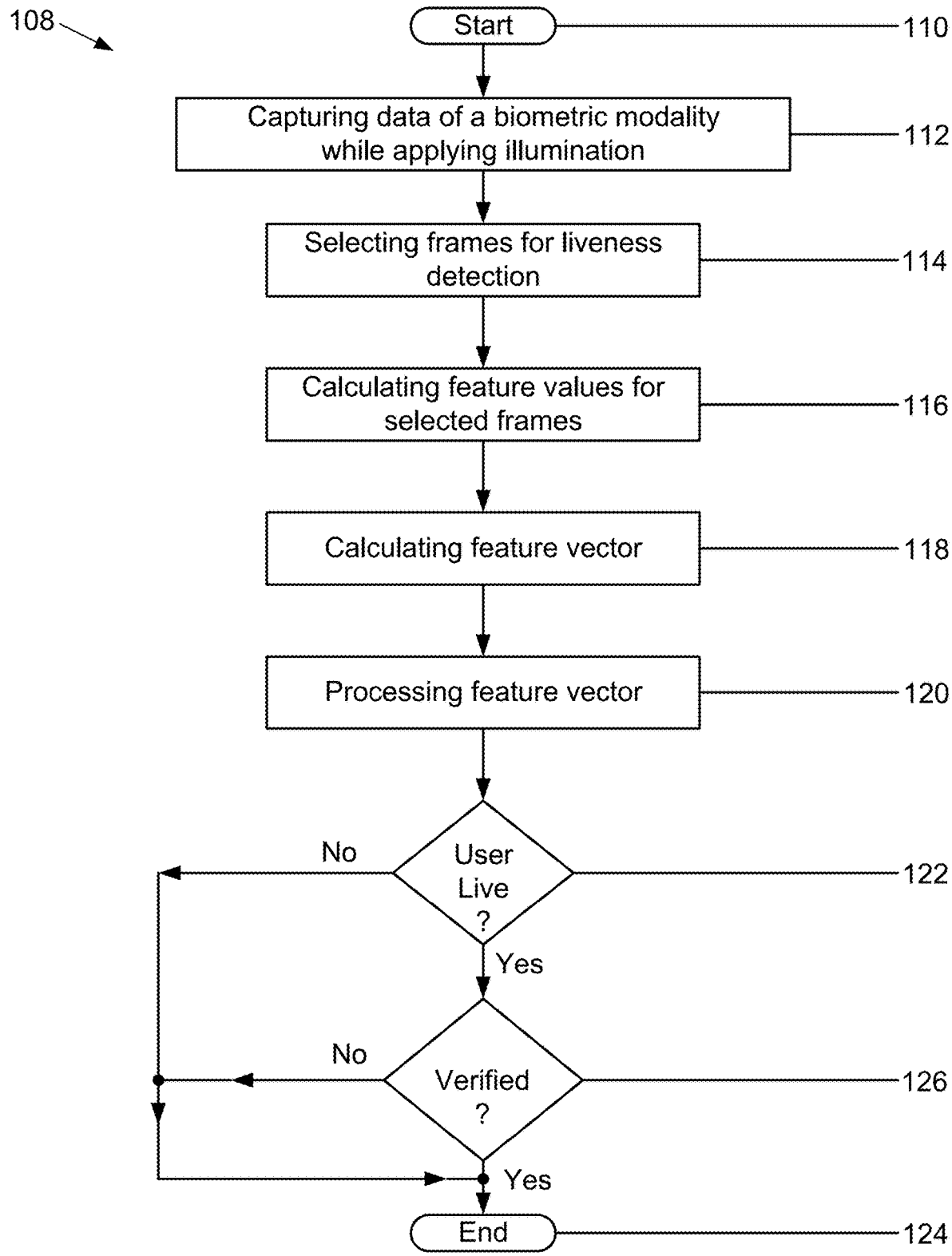
FIG. 25 is a flowchart illustrating an example method for detecting user liveness based on data of a biometric modality captured from a person.

FIG. 25 is a flowchart 108 illustrating an example method for detecting user liveness based on data of a biometric modality captured from a user. A user may be required to prove he or she is live before being permitted to conduct, using the computing device 12, a network-based transaction. Such network-based transactions include, but are not limited to, buying merchandise from a merchant service provider website and accessing secure information from a financial institution website.

The process starts 110 with a user capturing 112 data of a biometric modality from his or her self with the computing device 12 as a sequence of frames while the computing device 12 applies illumination to the biometric modality in accordance with the signal 62. Next, processing continues by selecting 114 a frame captured during an on-state and a frame captured during an off-state, calculating 116 feature values for the selected frames, calculating 118 a feature vector from the feature values, processing 120 the feature vector by a tree-based model to calculate a confidence score, and determining whether the user is live 122 by comparing the confidence score against a threshold score.

When the confidence score is not equal to or greater than the threshold score, processing continues by concluding the captured biometric modality data was not captured from a live person 122, and transmitting a message indicating, for example, that the user's identity has not been successfully verified, to the service provider computer system operating the website on which the user desires to conduct the network-based transaction. Next, processing ends 124.

However, when the confidence score is equal to or greater than the threshold score, the captured biometric modality data is considered to be from a live person and a verification transaction 126 is conducted based on the biometric modality data from one of the selected frames. When the identity of the user is successfully verified 126, processing continues by transmitting a message to the service provider computer system operating the website on which the user desires to conduct the network-based transaction. The message may indicate, for example, that the user's identity has been successfully verified. Next, processing ends 124. However, when the user is not successfully authenticated, processing continues by transmitting to the service provider computer system a message indicating, for example, that the user's identity has not been successfully verified. Next, processing ends 124.

The example liveness detection methods described herein use image data from two frames to calculate feature values during liveness detection. However, alternative example methods may use image data from any number of frames in the on and off-states. Doing so should enhance the accuracy of liveness detection results. When more than two frames are used, a same or a different number of frames from the on and off states may be used. Frames captured during the transitions between the on and off-states typically are not used for detecting user liveness because the signals 62 and 68 may not be in the same state during the transition. However, for illumination signals 62 that include a temporally longer transition, a frame captured during the transition period may be used to calculate feature values.

When more than two frames are used, additional separate confidence scores may be calculated and a person may be determined to be live when each confidence score is equal to or greater than the threshold score. Alternatively, the confidence scores may be fused into a single confidence score which is compared against the threshold score. The user may be deemed live when the fused confidence score is equal to or greater than the threshold score. Alternatively, the user may be deemed live when each confidence score or the fused confidence score is less than the threshold score.

To reduce the number of confidence scores when more than two frames are used, image data from frames captured under similar lighting conditions may be combined into a single frame. For example, when more than two frames from the on-state are used, the image data from the frames may be combined into a single frame. Likewise, the image data from the frames captured during the off-state may be combined into a single frame. The image data may be combined in any manner, for example, by averaging. Combining image data from several frames into a single frame reduces noise and uses all the data in the frames to generate more accurate liveness detection results. Any number of frames captured under similar lighting conditions may be combined into a single frame which may be used to calculate a confidence score.

The example methods described herein may be used while collecting data of a biometric modality of a user to store in the user's data record and during remotely conducted authentication transactions. Additionally, the example methods described herein may be used when capturing data from people anonymously for research purposes, which data must be captured from a live person to facilitate proper and accurate research. The capture is anonymous because the identity of the people is unknown. Liveness detection is conducted on such anonymously captured data to ensure it was captured from a live person.

Although the example methods for detecting user liveness described herein use feature calculation windows to facilitate calculating feature values, alternative example methods may calculate the feature values in any manner, for example, using principal component analysis (PCA) or linear discriminant analysis (LDA).

The example methods described herein may be conducted entirely by the computing device 12, or partly on the computing device 12 and partly on other computing devices 36 and computer systems 34 operable to communicate with the computing device 12 over the network 38. Moreover, the example methods described herein may be conducted entirely on the other computer systems 34 and other computing devices 36. Thus, the example methods may be conducted on any combination of computers, computer systems 34, and computing devices 36. Furthermore, data described herein as being stored in the memory 16 may alternatively be stored in any computer system 34 or computing device 36 operable to communicate with the computing device 12 over the network 38. Additionally, the example methods described herein may be implemented with any number and organization of computer program components. Thus, the methods described herein are not limited to specific computer-executable instructions. Alternative example methods may include different computer-executable instructions or components having more or less functionality than described herein.

In example embodiments, the above-described methods and systems enhance the accuracy and trustworthiness of user liveness detection results. More specifically, a user captures data of a biometric modality of his or her self with a computing device while the computing device applies illumination to the biometric modality in accordance with a signal. The data is captured as a sequence of frames and the signal includes periods in which the applied illumination is in an on-state and when it is in an off-state. First and second images are selected from the sequence of images. The first and second images are captured under different illumination conditions. Feature calculation windows are located in corresponding positions on the first and second images. Each window includes a first area and a second area. A feature value is calculated by the computing device for each window position based on pixels, within the windows located at the position, from the first and second images. A feature vector is calculated from the feature values, a confidence score is calculated from the feature vector, and the sequence of images is determined to include images of a live user when the confidence score is equal to or greater than the threshold score. As a result, detection of spoofing attempts is facilitated to be increased, accuracy and trustworthiness of user liveness detection results are facilitated to be enhanced, accuracy and trustworthiness of identity verification transactions are facilitated to be enhanced, and time wasted and costs incurred due to successful spoofing and faulty verification transaction results are facilitated to be reduced. Additionally, the processes described herein are convenient for users to implement on their personal computing devices.

The example methods for detecting user liveness described above should not be considered to imply a fixed order for performing the method steps. Rather, the method steps may be performed in any order that is practicable, including simultaneous performance of at least some steps. Moreover, the method steps may be performed in real time or in near real time. It should be understood that, for any process described herein, there can be additional, fewer, or alternative steps performed in similar or alternative orders, or in parallel, within the scope of the various embodiments, unless otherwise stated. Furthermore, the invention is not limited to the embodiments of the methods described above in detail. Rather, other variations of the methods may be utilized within the spirit and scope of the claims.

What is claimed is:

1. A method for detecting user liveness comprising the steps of:
   selecting first and second images from a sequence of images, the first and second images being captured under different illumination conditions;
   selecting feature calculation window types from a table;
   locating each selected window type in corresponding positions on the first and second images, each window including a first area and a second area;
   calculating, for each window type on the first image, an average pixel value from the pixels included in the first area;
   calculating, for each window type on the second image, an average pixel value from the pixels included in the second area;
   calculating a feature value for each window type as the difference between the average pixel values for the respective window type;
   calculating a feature vector from the feature values;
   calculating a confidence score from the feature vector; and
   determining the sequence of images includes images of a live user when the confidence score is equal to or greater than the threshold score.

2. A method for detecting user liveness in accordance with claim 1, further comprising the step of randomly illuminating, by the computing device, a biometric modality while the computing device captures the sequence of images.

3. A method for detecting user liveness in accordance with claim 2, said illuminating step comprising illuminating the biometric modality in accordance with a signal having on and off-states of random duration.

4. A method for detecting user liveness in accordance with claim 1, said calculating a feature value step further comprising calculating the feature values based on the content of a color channel of the first and second images.

5. A method for detecting user liveness in accordance with claim 1, said selecting first and second images step comprising:
   selecting a first group of images captured under a first illumination condition and a second group of images captured under a second illumination condition; and
   combining the image data of the first group of images to create the first image and combining the image data of the second group of images to create the second image.

6. A computing device for detecting user liveness comprising:
   a processor; and
   a memory configured to store data, said computing device being associated with a network and said memory being in communication with said processor and having instructions stored thereon which, when read and executed by said processor, cause said computing device to:
   select first and second images from a sequence of images, the first and second images being captured under different illumination conditions;
   select feature calculation window types from a table;
   locate each selected window type in corresponding positions on the first and second images, each window including a first area and a second area;
   calculate, for each window type on the first image, an average pixel value from the pixels included in the first area;
   calculate, for each window type on the second image, an average pixel value from the pixels included in the second area;

calculate a feature value for each window type as the difference between the average pixel values for the respective window type;
calculate a feature vector from the feature values;
calculate a confidence score from the feature vector; and
determine the sequence of images includes images of a live user when the confidence score is equal to or greater than the threshold score.

7. A computing device for detecting user liveness in accordance with claim 6, wherein the instructions when read and executed by said processor, further cause said computing device to randomly illuminate a biometric modality while capturing the sequence of images.

8. A computing device for detecting user liveness in accordance with claim 7, wherein the instructions when read and executed by said processor, further cause said computing device to illuminate the biometric modality in accordance with a signal having on and off-states of random duration.

9. A computing device for detecting user liveness in accordance with claim 6, wherein the instructions when read and executed by said processor, further cause said computing device to calculate the feature values based on the content of a color channel of the first and second images.

10. A computing device for detecting user liveness in accordance with claim 6, wherein the instructions when read and executed by said processor, further cause said computing device to:
select a first group of images captured under a first illumination condition and a second group of images captured under a second illumination condition; and
combine the image data of the first group of images to create the first image and combine the image data of the second group of images to create the second image.

11. A non-transitory computer-readable recording medium included in a computing device having a computer program recorded thereon for detecting user liveness, the computer program being comprised of instructions, which when read and executed by the computing device, cause the computing device to:
select first and second images from a sequence of images, the first and second images being captured under different illumination conditions;
select feature calculation window types from a table;
locate each selected window type in corresponding positions on the first and second images, each window including a first area and a second area;
calculate, for each window type on the first image, an average pixel value from the pixels included in the first area;
calculate, for each window type on the second image, an average pixel value from the pixels included in the second area;
calculate a feature value for each window type as the difference between the average pixel values for the respective window type;
calculate a feature vector from the feature values;
calculate a confidence score from the feature vector; and
determine the sequence of images includes images of a live user when the confidence score is equal to or greater than the threshold score.

12. A non-transitory computer-readable recording medium in accordance with claim 11 wherein the instructions when read and executed by said computing device, further cause said computing device to randomly illuminate a biometric modality while capturing the sequence of images.

13. A non-transitory computer-readable recording medium in accordance with claim 12 wherein the instructions when read and executed by said computing device, further cause said computing device to illuminate the biometric modality in accordance with a signal having on and off-states of random duration.

14. A non-transitory computer-readable recording medium in accordance with claim 11 wherein the instructions when read and executed by said computing device, further cause said computing device to calculate the feature values based on the content of a color channel of the first and second images.

15. A non-transitory computer-readable recording medium in accordance with claim 11 wherein the instructions when read and executed by said computing device, further cause said computing device to:
select a first group of images captured under a first illumination condition and a second group of images captured under a second illumination condition; and
combine the image data of the first group of images to create the first image and combine the image data of the second group of images to create the second image.

* * * * *